United States Patent [19]

Haak

[11] Patent Number: 4,566,885
[45] Date of Patent: Jan. 28, 1986

[54] GAS LIQUEFACTION PROCESS

[75] Inventor: Frederik W. Haak, The Hague, Netherlands

[73] Assignee: Shell Oil Company, Houston, Tex.

[21] Appl. No.: 657,856

[22] Filed: Oct. 5, 1984

[30] Foreign Application Priority Data

Nov. 18, 1983 [GB] United Kingdom ............. 8330762

[51] Int. Cl.[4] ............................................. F25J 1/00
[52] U.S. Cl. ............................................. 62/9; 62/21; 62/40
[58] Field of Search ............... 62/9, 11, 21, 36, 37, 62/38, 39, 40, 215, 226, 227, 228.1, 229, 230

[56] References Cited

U.S. PATENT DOCUMENTS

| | | | |
|---|---|---|---|
| 3,690,114 | 9/1972 | Swearingen et al. | 62/11 |
| 3,735,600 | 5/1973 | Dowdell et al. | 62/39 |
| 3,817,046 | 6/1974 | Aoki et al. | 62/40 |
| 3,919,852 | 11/1975 | Jones | 62/7 |

FOREIGN PATENT DOCUMENTS 895094  5/1962  United Kingdom .
1291467 10/1972 United Kingdom .
1572898  8/1980 United Kingdom .

Primary Examiner—Frank Sever

[57] ABSTRACT

The invention relates to a method of liquefying a gas, in particular a natural gas by cooling it under pressure in stages. The gas is cooled by means of at least two refrigerants, one refrigerant circulating in a closed refrigeration circuit and another refrigerant circulating in another closed refrigeration circuit, wherein the compositions of the two refrigerants differ from each other. According to the invention a compressor in a closed refrigeration circuit is driven by a gas turbine and the refrigerant circulating in the last mentioned closed refrigeration circuit is cooled by ambient air after compression. Furthermore, according to the invention, in addition to the compressor an electric generator is driven by the gas turbine in such a manner that, when extra gas turbine power is available because of a variation of the ambient air temperature, electric power is generated so that the gas turbine will operate at, or at about, its design load. The electric power is passed to an auxiliary electric motor coupled to a compressor in the other closed refrigeration circuit, to deliver extra driving power to said compressor.

8 Claims, 1 Drawing Figure

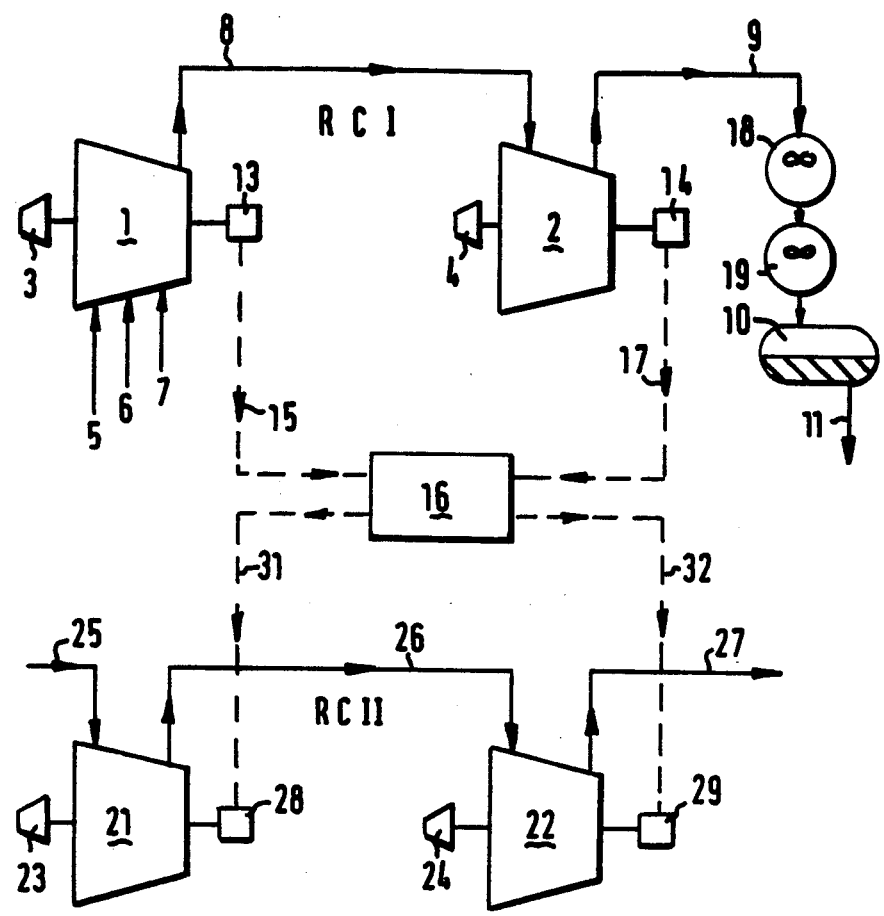

GAS LIQUEFACTION PROCESS

BACKGROUND OF THE INVENTION

The invention relates to a method and a system for liquefying a gas, in particular a natural gas, by cooling it under pressure in stages, wherein the natural gas is cooled by means of at least two refrigerants. One refrigerant circulates in a closed refrigeration circuit and the othr refrigerant circulating in another closed refrigeration circuit, wherein the compositions of the two refrigerants differ from each other.

Various embodiments of the above method and system are known, for example, in British patent specification No. 895,094, published on May 2, 1962, British patent specification No. 1,572,898 published on Aug. 6, 1980, and British patent specification No. 1,291,467 published on Oct. 4, 1972.

In these known methods and systems various kinds of refrigerants are used, for example, a single component refrigerant in a closed refrigeration circuit and a so-called multi-component or mixed refrigerant in another closed refrigeration circuit, or a multi-component refrigerant in a closed refrigeration circuit and another multi-component refrigerant in another closed refrigeration circuit.

For example, in British patent specification No. 1,291,467 an embodiment of the above-mentioned method is described, wherein a refrigerant circulating in a closed refrigeration circuit is propane and another refrigerant circulating in another closed refrigeration circuit is a multi-component refrigerant comprising nitrogen, methane, ethane and propane.

In liquefaction methods and systems of the above known kind, in each closed refrigeration circuit the refrigerant is normally compressed in at least one compressor, cooled in order to remove the compression heat and further cooled in order to liquefy the refrigerant. Then the liquid refrigerant is expanded in one or more stages and evaporated to produce refrigeration, whereafter the refrigerant is returned to the compressor to repeat the cycle.

The cooling of the refrigerant after compression is often carried out by means of water supplied from a river or from the sea and returned to the river or sea after the cooling step. This has the advantage that the temperature of the cooling water is reasonably constant. It has the disadvantage, however, that large capital investments are necessary for pipelines, pumps and other equipment for supplying the water to the liquefaction system and for returning the water to the river or the sea. A substantial reduction of the necessary capital expenditure is possible by carrying out the cooling step by means of ambient air.

A further reduction of capital expenditure can be obtained by driving the compressors by gas turbines, instead of by steam turbines, since in that case large capital investments in a steam generating plant are unnecessary.

However, when driving a compressor of a closed refrigeration circuit by means of a gas turbine and when cooling the refrigerant after compression by means of air, the following problems occur. In the first place, a gas turbine can deliver more power at lower ambient temperatures than at higher ambient temperatures. Moreover, when the refrigerant after compression is cooled by ambient air and is condensed against ambient air, this has the result that at lower temperatures of the ambient air, the compressor in the refrigeration circuit requires less power than at higher temperatures of the ambient air. The result is that a lower ambient temperatures the gas turbine driving the compressor in the refrigeration circuit runs at part of its design load and thus not at optimal efficiency, because the process and/or equipment constraints do not allow full shifting of available power.

SUMMARY OF THE INVENTION

It is an object of the invention to solve this problem so that the gas turbine always runs at its design load and at optimal efficiency.

For this purpose, the method for liquefying a gas, in particular a natural gas, by cooling it under pressure in stages comprises, according to the invention, cooling the gas by means of at least two refrigerants. One refrigerant circulates in a closed refrigeration circuit and another refrigerant circulates in another closed refrigeration circuit, wherein the compositions of the two refrigerants differ from each other. The compressor in one of the closed refrigeration circuits is driven by a gas turbine and is cooled by ambient air. In addition, an electric generator is driven by the gas turbine in such a manner that, when extra gas turbine power is available because of a variation of the ambient temperature, electric power is generated. The amount of power generated is controlled so that the gas turbine operates at, or at about, its design load. The electric power is used to power an electric motor that drives the compressor in the other closed refrigeration circuit, to deliver extra driving power to said compressor.

The advantage of this arrangement is that, when a gas turbine driving a compressor in a closed refrigeration circuit has extra power available as a result of the temperatures of the ambient air, electric powr is generated so that the gas turbine runs at design load conditions and at optimal efficiency. Another advantage is that the electric power generated can be used in an extremely useful way, viz. by using this electric power for increasing the refrigerant flow in the refrigerant compressor in other closed refrigeration circuits. This increased flow of refrigerant is caused by the extra mechanical power supplied by the auxiliary electric motor in the other closed refrigeration circuit. This increased flow of refrigerant in the other closed refrigeration circuit has the advantage that extra refrigeration will be produced in said other closed refrigeration circuit. The extra refrigeration can be used for liquefying an extra quantity of natural gas, or for cooling a refrigerant flowing in another closed refrigeration circuit.

The present invention relates as well to a system for carrying out the above method according to the invention.

BRIEF DESCRIPTION OF THE DRAWING

The invention will now be explained with reference to the drawing, which shows schematically one embodiment of a system for carrying out the method according to the invention.

DESCRIPTION OF PREFERRED EMBODIMENT

In the drawing RCI indicates a relevant part of a closed refrigeration circuit, for precooling a natural gas stream (not shown) which is to be liquefied and/or for precooling a refrigerant circulating in another closed refrigeration circuit. RCII indicates a relevant part of another closed refrigeration circuit for further cooling and finally liquefying the said natural gas stream.

In RCI a low pressure (LP) compressor 1 is coupled to a gas turbine 3 for driving the LP compressor 1 and a high pressure (HP) compressor 2 is coupled to a gas turbine 4 for driving the HP compressor 2. The LP compressor 1 is provided with refrigerant supply conduits respectively 5, 6 snd 7. The outlet of the LP compressor 1 is connected to the inlet of the HP compressor 2 by means of a refrigerant conduit 8. The outlet of the HP compressor 2 is connected via a refrigerant conduit 9 and air coolers 18, respectively 19, to a refrigerant receiver 10. Refrigerant present in refrigerant receiver 10 can leave the receiver 10 through an outlet conduit 11.

The LP compressor 1 is coupled to an electric generator 13, so that the gas turbine 3 can drive both the LP compressor 1 and the electric generator 13. Preferably, the gas turbine 3, the LP compressor 1 and the electric generator 13 have a common shaft. The electric generator 13 is connected by means of an electric circuit 15 to a set of electric convertors, associated switch gear and controls indicated by reference numeral 16.

In its turn, the HP compressor 2 is coupled to an electric generator 14, so that the gas turbine 4 can drive both the HP compressor 2 and the electric generator 14. Preferably, the gas turbine 4, the HP compressor 2 and the electric generator 14 have a common shaft. The electric generator 14 is connected by means of an electric circuit 17 to the set of electricity convertors 16.

In RCII a low pressure (LP) compressor 21 is coupled to driving means 23, which is preferably a gas turbine, for driving the LP compressor 21 and a high pressure (HP) compressor 22 is coupled to driving means 24, preferably a gas turbine, for driving the HP compressor 22. The LP compressor 21 is provided with a refrigerant supply conduit 25 which is connected to the inlet of the LP compressor 21. The outlet of the LP compressor 21 is connected to the inlet of the HP compressor 22 by means of a refrigerant conduit 26, whereas the outlet of the HP compressor 22 is connected to a refrigerant conduit 27.

The LP compressor 21 is coupled to an auxiliary electric motor 28, so that both the driving means 23, which is preferably a gas turbine, and the auxiliary electric motor 28 can drive the LP compressor 21. Preferably, the driving means 23, the LP compressor 21 and the auxiliary electric motor 28 have a common shaft. The auxiliary electric motor 28 is connected by means of an electric circuit 31 to the electricity convertors 16.

In its turn, the HP compressor 22 is coupled to an auxiliary electric motor 29, so that both the driving means 24, which is preferably a gas turbine, and the auxiliary electric motor 29 can drive the HP compressor 22. Preferably, the driving means 24, the HP compressor 22 and the auxiliary electric motor 29 have a common shaft. The auxiliary electric motor 29 is connected by means of an electric circuit 32 to the said electricity convertors 16.

The operation of the system according to the invention will now be explained more in detail with reference to the drawing.

In the closed refrigeration circuit RCI a suitable refrigerant for example a multi-component refrigerant such as a mixture of propane and ethane or a single component refrigerant such as propane, is circulating during normal use of the liquefaction system.

For the sake of simplicity, it is assumed that the refrigerant circulating in the closed refrigeration circuit RCI is propane. The propane is supplied in gaseous condition through the refrigerant supply conduits 5, 6 and 7 to the LP compressor 1 which is driven by the gas turbine 3, wherein the pressures of the gaseous propane is lowest in supply conduit 5 and highest in supply conduit 7. The pressure of gaseous propane in supply conduit 6 is somewhere between the pressures in supply conduits 5 and 7. In the LP compressor 1 the pressure of the gaseous propane is raised, and it is then passed through the refrigerant conduit 8 to the inlet of the HP compressor 2. The HP compressor 2 is driven by the gas turbine 4 and in the HP compressor 2 the pressure of the gaseous propane is further raised. The pressurized gaseous propane leaves the outlet of the HP compressor 2 and is passed through conduit 9 and via air coolers 18 and 19 to the receiver 10. In the air coolers 18 and 19, the gaseous propane is cooled to such a degree that it liquefies. The liquid propane is collected in the receiver 10 and is passed through the conduit 11 to a plurality of evaporators (not shown). The liquid propane is expanded in stages to various pressure levels and is passed to corresponding evaporators. In the various evaporators the liquid propane is evaporated, in each evaporator at a different pressure. The result is that in each evaporator refrigeration is produced at different temperature levels corresponding to the pressure maintained in each evaporator. After evaporation of the liquid propane in the evaporators, the gaseous propane is returned at various pressures through the refrigerant supply conduits 5, 6 and 7 to the LP compressor 1 to repeat the cycle. The refrigeration produced in the various evaporators at the various temperature levels is used for precooling the natural gas to be liquefied and also for cooling the refrigerant circulating in the other closed refrigeration circuit RCII.

The operation of the other closed refrigeration circuit RCII will now be described. The refrigerant circulating in the closed refrigeration circuit RCII is, for example, a multi-component refrigerant (MC refrigerant), for example a mixture of nitrogen, methane, ethane and propane. The MC refrigerant is supplied in gaseous condition through refrigerant supply conduit 25 to the inlet of the LP compressor 21. The LP compressor 21 is driven by driving means 23, for example by a steam turbine, but preferably by a gas turbine 23. In the LP compressor 21, the pressure of the MC refrigerant is raised to a higher level and is then passed in gaseous condition from the outlet of the LP compressor 21 to the inlet of the HP compressor 22 through refrigerant conduit 26. The HP compressor 22 is driven by driving means 24, for example by a steam turbine, but preferably by a gas turbine. In the HP compressor 22 the pressure of the gaseous MC refrigerant is further raised. The high pressure gaseous MC refrigerant leaves the HP compressor 22 via the refrigerant conduit 27.

The gaseous MC refrigerant is passed to coolers, preferably air coolers, to remove the compression heat from the gaseous MC refrigerant. Then the MC refrigerant is further cooled by means of a plurality of evaporators (not shown) of the above-described closed refrigerant circuit RCI, so that the MC refrigerant liquefies. The liquefied MC refrigerant is expanded in stages and is evaporated in various evaporators. In each of said evaporators a different pressure is maintained so that each evaporator produces refrigeration at a different temperature range. The refrigeration produced is used to cool the already precooled natural gas stream further so that the natural gas finally liquefies completely.

The above-described operation of the closed refrigeration circuit RCI and of the closed refrigeration circuit RCII is basically conventional.

The operation of the essentially novel features according to the invention will be described below.

During the operation of the LP compressor 1 and of the HP compressor 2, the gas turbine 3 drives, in addition to the LP compressor 1, the electric generator 13 and the gas turbine 4 drives, in addition to the HP compressor 2, the electric generator 14. By means of the operation of said electric generators 13 and 14, it is possible to cause the gas turbines 3 and 4 to run at their design loads and at optimal efficiency even when the ambient air temperature is low, as explained above.

The electricity produced by the electric generators 13 and 14 is led through respectively the electric circuits 15 and 17 to the set of electricity convertors 16. The electric generators 13 and 14 are synchronous AC generators. The set of convertors 16 comprises rectifiers in which the electric current as supplied from the generators 13 and 14 is converted into DC. The set of convertors 16 comprises furthermore load commutated invertors in which said DC is reconverted at AC at frequencies suitable for feeding the auxiliary electric motors 28, respectively 29. From the set of convertors 16, the electric energy is fed via the electric circuit 31 to the auxiliary electric motor 28 and via the electric circuit 31 to the auxiliary electric motor 29. In the auxiliary electric motors 28, respectively 29, the electric energy is converted into mechanical energy and this extra mechanical energy is supplied to, and is used for driving, respectively the LP compressor 21 and the HP compressor 22.

In other words, in addition to the mechanical energy supplied to the LP compressor 21 by the driving means 23, extra mechanical energy is supplied to the LP compressor 21 by the auxiliary electric motor 28. Furthermore, in addition to the mechanical energy supplied to the HP compressor 22 by the driving means 24, extra mechanical energy is supplied to the HP compressor 22 by the auxiliary electric motor 29.

With the above described "electrical load balancing device" excess power available at the propane compressors 1 and 2, when the ambient air temperatures are low, can be transferred to the MC refrigerant compressors 21 and 22. The result is that MC refrigerant flow in the closed refrigeration circuit RCII will increase. This increased flow of MC refrigerant means that more refrigeration is produced in the closed refrigeration circuit RCII, so that additional quantities of natural gas can be liquefied.

In the embodiment of the natural gas liquefaction method and system according to the invention as described above, only two closed refrigeration circuits are mentioned. It is however, possible to apply the invention as well to liquefaction methods and systems comprising more than two closed refrigeration circuits.

Furthermore, it is observed that the invention can be applied as well to natural gas liquefaction methods and systems in which different single component refrigerants are used, each circulating in its own closed refrigeration circuit.

The electric convertors and associated equipment 16 described above is commercially available from several manufacturers as adjustable-speed drives or variable speed drives.

What is claimed is:

1. A method for liquefying a natural gas by cooling it under pressure in stages, comprising:
   cooling the natural gas by means of at least two refrigerants having different compositions, said refrigerants being circulated by separate compressors in separate closed refrigeration systems;
   driving a first compressor in a first one of the closed systems with a gas turbine and cooling the compressed refrigerant with ambient air;
   driving, in addition to said first compressor, an electric generator and controlling said generator so that said turbine normally operates at substantially its designed load as the temperature of said ambient air varies; and
   supplying the electric power generated to an auxiliary electric motor coupled to a second compressor in a second of said closed systems to deliver extra driving power to said second compressor.

2. The method as claimed in claim 1, wherein the refrigerant circulating in said first closed refrigeration system is a single component refrigerant.

3. The method as claimed in claim 2, wherein the refrigerant circulating in a said first closed refrigeration system is propane.

4. The method of claims 1, 2 or 3, wherein the refrigerant circulating in said second closed refrigeration system is a multi-component refrigerant.

5. The method as claimed in claim 4, wherein the multi-component refrigerant circulating in said second closed refrigeration system is a mixture comprising nitrogen, methane, ethane and propane.

6. The method as claimed in claim 4, wherein the multi-component refrigerant circulating in the second closed refrigeration system is a mixture comprising ethane and propane.

7. The method of claims 1, 2 or 3, and in addition generating AC electric current by an electric generator, converting the AC electric current generated to DC electric current and converting the DC electric current to AC electric current at a frequency suitable for driving the auxiliary electric motor.

8. The method as claimed in claim 7, comprising generating the AC electric current by a synchronous AC electric generator.

* * * * *